United States Patent
Graf

[15] 3,684,936
[45] Aug. 15, 1972

[54] FIRING SIGNAL TRANSMISSION CONTROL MEANS FOR INVERTER CIRCUITS

[72] Inventor: Carlton E. Graf, Erie, Pa.
[73] Assignee: General Electric Company
[22] Filed: Aug. 16, 1971
[21] Appl. No.: 172,118

[52] U.S. Cl. .................. 318/227, 321/5, 321/11, 321/45 C, 321/45 S
[51] Int. Cl. ........................................ H02p, H02m
[58] Field of Search .............. 321/5, 11–13, 45 R, 321/45 S, 45 C; 318/227

[56] References Cited

UNITED STATES PATENTS

| | | | |
|---|---|---|---|
| 3,120,634 | 2/1964 | Genuit | 321/45 C |
| 3,504,264 | 3/1970 | Suelzle | 321/45 R |
| 3,582,757 | 6/1971 | Achinger | 321/45 R |
| 3,593,103 | 7/1971 | Chandler | 321/5 |
| 3,611,111 | 10/1971 | Johnston | 321/45 C |

*Primary Examiner*—William H. Beha, Jr.
*Attorney*—James C. Davis, Jr. et al.

[57] ABSTRACT

An inverter circuit of the type including load current carrying gate controlled rectifiers and commutating gate controlled rectifiers is provided with means for controlling the transmission of firing signals to the controlled rectifiers such that, upon starting, operation is always initiated by the firing of one of the commutating rectifiers to assure proper charging of a commutating capacitor prior to the firing of the first load rectifier. Upon stopping, the firing signal transmission control apparatus is effective to cause operation to cease with the firing of one of the commutating rectifiers and the resulting current flow through the commutating capacitor.

18 Claims, 3 Drawing Figures

FIG.1

INVENTOR.
CARLTON E. GRAF

BY George R. Powers

HIS ATTORNEY

FIRING SIGNAL TRANSMISSION CONTROL MEANS FOR INVERTER CIRCUITS

BACKGROUND OF THE INVENTION

1. Field of the Invention

This invention relates to the control of firing signals to gate controlled rectifiers of inverter circuits and, more particularly, to firing signal transmission control means for assuring that inverter start-up and shut-down are accomplished in an orderly manner.

2. Description of the Prior Art

This invention is particularly applicable to the protection of inverter power circuits in drive systems of the general type disclosed and claimed by copending patent application Ser. No. 81,758, entitled "Adjustable Speed Polyphase A-C Motor Drive," filed on Oct. 19, 1970, in the names of Carlton E. Graf and Werner K. Volkman, and by copending patent application Ser. No. 81,757, entitled "Synchronous Time Ratio Control Power Regulator," filed on Oct. 19, 1970, in the name of Carlton E. Graf, both applications being assigned to the assignee of this invention. While the present invention will be described herein in connection with a drive system of the type taught by the aforesaid patent applications to the extent necessary for a full and complete understanding of the invention, a more complete understanding of such inverter circuits may be obtained from 3,207,974 aforesaid patent applications and U.S. Pat. No. 3,207.974 to McMurray, also assigned to the assignee of this invention.

In inverter circuits of the type disclosed by the aforesaid references, direct current electric power is changed or "inverted," to alternating current electric power by means of load current carrying gate controlled rectifiers, such as silicon controlled rectifiers (SCR's), connected in series across the source of direct current power. The load rectifiers are commutated "off" by commutating circuitry including gate controlled commutating rectifiers. By way of example, direct current power is inverted to single phase alternating current power by means of a pair of controlled load rectifiers and a commutating circuit including a respective pair of controlled commutating rectifiers, a commutating capacitor, and a commutating inductor. In a multi-phase inverter system, similar circuitry is provided for each phase. To commutate a particular load rectifier "off," the respective commutating rectifier is turned "on" by means of a firing signal or pulse to connect a series oscillatory circuit including the associated capacitor and the associated inductor across the load rectifier. A current pulse produced by the discharging series oscillatory circuit takes over the function of supplying the load current, excess commutation current being conducted around the load rectifier by a feedback diode. While the commutation current exceeds the load current, the load rectifier is reversely biased and is turned "off" if the reverse bias lasts for a period greater than the turn-off time of the rectifier. After the commutating capacitor has been charged to an opposite polarity, the commutating rectifier turns "off," and the commutating circuit is now in a condition to commutate the other of the pair of load rectifiers.

Conduction of each controlled rectifier is initiated by means of a firing signal or pulse supplied thereto. For proper operation, it is essential that the rectifiers be fired or turned "on" in a predetermined cyclic sequence. If the rectifiers are identified by the letters A, B, C and D with the load rectifier connected to the positive bus and the commutating rectifier connected to the positive bus being respectively A and B, the other load rectifier being C, and the other commutating rectifier being D, the proper cyclic sequence during operation is ABCDABCD . . . . Thus, if rectifier A is conducting, the firing of rectifier B next will commutate rectifier A and charge the commutating capacitor to the proper polarity for the subsequent commutation of rectifier C. Any departure from the proper sequence or from the proper firing signal frequency, as taught by the aforesaid patent applications, can result in improper and potentially damaging operation of the inverter circuit. For example, if rectifier A were fired while the commutating capacitor was either uncharged or charged with the wrong polarity, the subsequent firing of rectifier B would not cause commutation of rectifier A and rectifier A would therefore still be conductive when rectifier C is turned "on." The result would be a "shoot-through" or short circuit between the positive and negative direct current buses through rectifiers A and C.

From the above, it will be seen that the commutating capacitor should be properly charged prior to the firing of a load rectifier. During normal operation, the delivery of the firing signals in the prescribed cyclic sequence and at the proper frequency will assure proper charging of the capacitor. Upon start-up, however, it is not sufficient to merely resume the sequence at the point where it was stopped during the previous shut-down. For example, if commutating rectifier D was last fired prior to the previous shut-down, a subsequent start-up by initially firing rectifier A would be successful only if the charge had been retained on the commutating capacitor. If, however, the capacitor had lost its charge for some reason during the interim, it would not be capable of commutating off rectifier A upon firing of rectifier B. It will also be appreciated that the sequence cannot be terminated at any point during normal shut-down. If, for example, the last firing pulse delivered to the inverter circuit should be directed to one of the load rectifiers A or C, the load would remain connected to the respective d-c bus and an orderly shut-down would not occur since the load rectifier would not be commutated off.

In addition to the foregoing considerations, it may be desirable that start-up or shut-down of an inverter circuit not be attempted unless various operating parameters are within certain acceptable ranges. For example, it would be undesirable to start operation if the d-c bus voltage were excessive, and it would also be undesirable under certain conditions to stop operation at a high operating frequency. For various inverter applications, additional and different parameters will be significant with respect to orderly start up and stopping procedures.

SUMMARY OF THE INVENTION

It is therefore an object of this invention to provide improved control means for accomplishing orderly start-up of an inverter circuit.

Another object of this invention is to provide improved control means for accomplishing orderly shut-down of an inverter circuit.

Still another object is to provide in inverter apparatus means for providing during start-up operation charging of the commutating capacitor prior to the initial firing of a load rectifier.

A further object of the invention is to provide in inverter apparatus means for providing during shut-down operation proper commutation of all load rectifiers.

A still further object of the invention is to provide in inverter apparatus means for assuring that start-up or shut-down will not occur when prescribed operating conditions are not present.

Briefly stated, in carrying out the invention in one form, an inverter circuit having firing signal generation means for generating firing signals for delivery in a predetermined cyclic sequence to load and commutating rectifiers is provided with a control signal generator for producing an operate signal when inverter operation is desired and a non-operate signal when inverter operation is not desired. A first firing signal transmission means is coupled between the firing signal generator and the commutating rectifiers, the first transmission means having a first operative condition in which transmission of firing signals to the commutating rectifiers is permitted and a second operative condition in which transmission of firing signals to the commutating rectifiers is prevented. A second firing signal transmission means is coupled between the firing signal generator and the load rectifiers, the second transmission means having a first operative condition in which transmission of firing signals to the load rectifiers is permitted and a second operative condition in which transmission of firing signals to the load rectifiers is prevented. A first enabling means is coupled to the control signal generator and the first transmission means, the first enabling means being responsive to an operate signal to maintain the first transmission means in its first operative condition throughout the entire duration of the operate signal. A second enabling means is coupled to the control signal generator, the second transmission means, and the firing signal generator, the second enabling means being responsive to an operate signal and the first firing signal to a commutating rectifier following the initiation of an operate signal to maintain the second transmission means in its first operative condition throughout the remaining duration of the operate signal. Operation as just described assures that operation of the inverter circuit is always initiated by the firing of one of the commutating rectifiers. This start-up procedure will assure proper charging of the commutating capacitor prior to the firing of the first load rectifier.

By a further aspect of the invention, the first enabling means is responsive to a non-operate signal and the firing of one of the commutating rectifiers following the initiation of the non-operate signal to maintain the first transmission means in its second operative position for the remaining duration of the non-operate signal. The second enabling means is responsive to the operate signal to maintain the second transmission means in its second operative condition throughout the entire duration of the non-operate signal. Operation as just described assures that operation of the inverter circuit always ceases with the firing of a commutating rectifier, this procedure assuring that all load rectifiers are rendered non-conductive prior to shut-down. By a still further aspect of the invention, the control signal generator has at least one primary input and at least one secondary input, and the control signal generator is adapted to initially generate a selected one of the operate and non-operate signals only in response to a combination of a predetermined signal at the primary input and a predetermined signal at the secondary input and to thereafter maintain the selected output signal so long as the predetermined signal is maintained at the primary input. Through suitable selection of the signals supplied to the secondary inputs, basic signals such as "start" and "stop" signals supplied to a primary input will not be converted into operate and non-operate signals unless proper secondary conditions are present.

BRIEF DESCRIPTION OF THE DRAWINGS

While the novel features of this invention are set forth with particularlity in the appended claims, the invention, both as to organization and content, will be better understood and appreciated, along with other objects and features thereof, from the following detailed description taken in conjunction with the drawings, in which:

DETAILED DESCRIPTION

Figure 1:
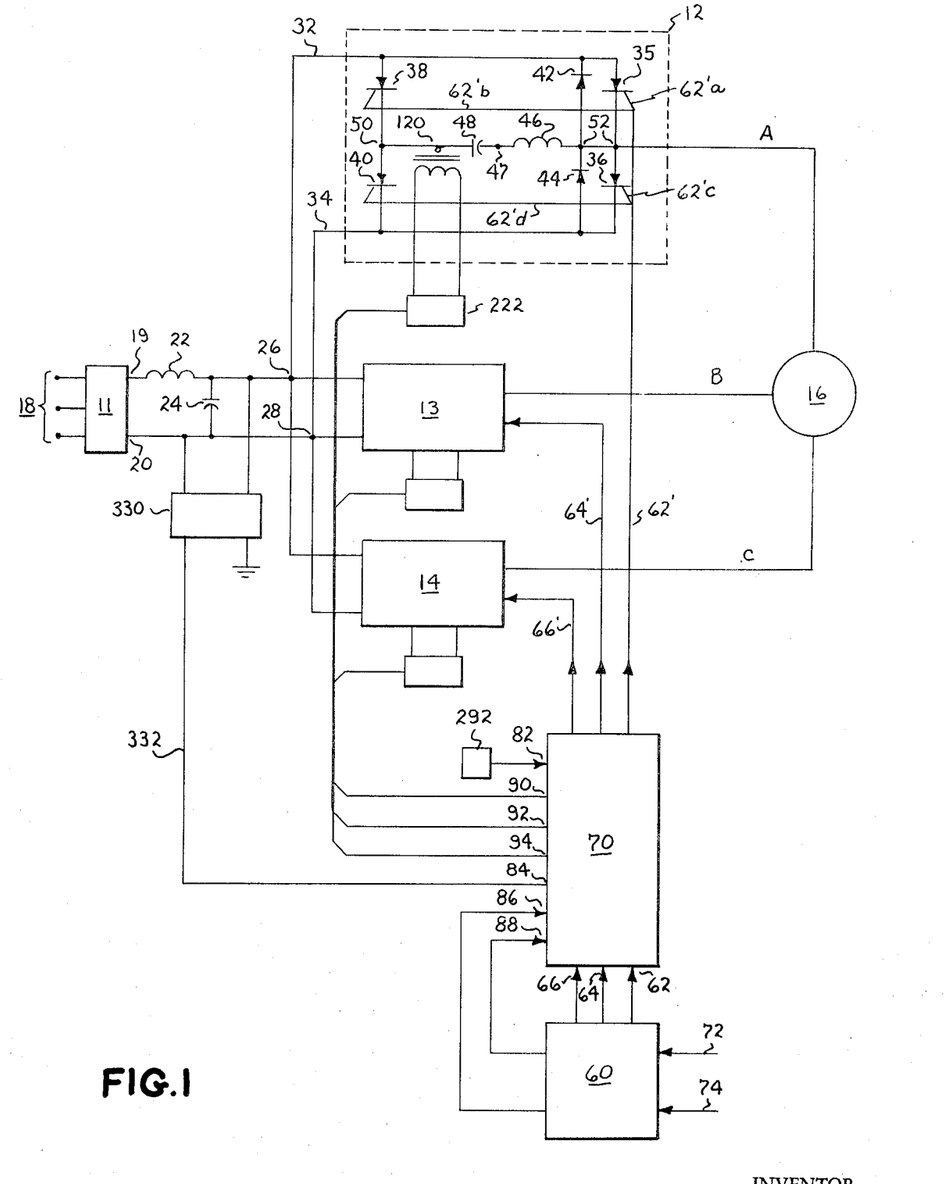
FIG. 1 is a partially schematic block diagram of an a-c adjustable speed drive system incorporating the present invention.

Referring first to FIG. 1, an a-c drive system is illustrated in block diagram form, the drive system including a d-c power supply 11, power conversion apparatus including inverter circuits 12, 13 and 14, and a load 16 which is preferably an a-c polyphase motor. The d-c power supply 11 is typically energized from a commercially available source 18 of three-phase alternating current electric potential, and, therefore, provides a pulsating d-c potential between its output terminals 19 and 20 that is filtered or smoothed by a suitable filter network including a filter inductor 22 and a shunt connected filter capacitor 24. Accordingly, relatively smooth d-c potential is supplied to the input terminals 26 and 28 of the power conversion apparatus when electric power is being supplied thereto from the source 11. It will, of course, be readily apparent that the source 11 could be a battery or other source of d-c potential. The purpose of the inverter circuits 12, 13 and 14 is to convert the electric power supplied thereto into another form, whether it be a d-c to a-c transformation or an a-c to d-c transformation (regeneration).

As indicated, the load 16 is preferably a three-phase motor supplied with polyphase electric power from the inverter circuits 12, 13 and 14 of the power conversion apparatus over phase conductors A, B and C. The inverter circuit 12 for Phase A includes a positive bus 32 connected to the input terminal 26 and a negative bus 34 connected to the input terminal 28. The inverter circuit 12 also includes a pair of load current carrying gate controlled rectifiers 35 and 36 connected in series between the positive bus 32 and the negative bus 34 with the anode of rectifier 35 connected to the positive bus 32. Gate controlled rectifiers 38 and 40 are also connected in series between the buses 32 and 34 with the same polarity as the gate controlled rectifiers 35 and 36. The gate controlled rectifiers 35, 36, 38 and 40 are preferably silicon controlled rectifiers (SCR's), but it will be obvious that functionally equivalent devices such as gaseous thyratrons can be used. Diode rectifiers 42 and 44 are connected to parallel the controlled rectifiers 35 and 36, respectively, in reverse polarity, and an inductance 46 and a capacitor 48 are connected in series between the junction 50 of the gate controlled rectifiers 38 and 40 and the junction 52 of the gate controlled rectifiers 35 and 36 and the diode rectifiers 42 and 44. Phase A of the motor 16 is connected to the junction 52 for receiving alternating current from the inverter circuit 12. Inverter circuits 13 and 14 for supplying alternating current to Phases B and C, respectively, are identical in physical structure and mode of connection to the d-c source 11 to the inverter circuit 13. For this reason, inverter circuits 13 and 14 are illustrated by FIG. 1 in block form.

Still referring to FIG. 1, block 60 represents the main control apparatus for the drive system. As explained more fully by the aforesaid patent application, the main control 60 includes apparatus for generating firing pulses or signals for delivery to the load and commutating rectifiers of each of the inverter circuits 12, 13 and 14. For each inverter circuit, the firing signals are generated in a precise cyclic sequence as outlined above. More particularly, the firing signal generation apparatus of block 60 generates firing pulses for circuit 12 on line 62, for circuit 13 on line 64, and for circuit 14 on line 66. The firing signals on lines 62, 64 and 66 are directed through transmission control apparatus 70 which, in accordance with the present invention, selectively controls the transmission of the firing signals to the circuits 12, 13 and 14 during start-up and shut-down operation of the drive system. For the present description, it can be noted that the transmission control apparatus 70 permits unrestricted passage of the firing signals during normal inverter operation at times other than at start-up or shut-down. During normal inverter operation, the firing signals on line 62 are supplied on line 62' to circuit 12, the signals on line 64 are supplied on line 64' to circuit 13, and the signals on line 66 are supplied on line 66' to circuit 14. As illustrated, the line 62' is actually a schematic illustration for individual conductors 62'a, 62'b, 62'c and 62'd over which the firing signals are supplied in the cyclic sequence to the respective rectifiers 35, 38, 36 and 40. The lines 62, 64, 66, 64' and 66' are similarly schematic illustrations for groups of individual conductors over which firing signals are delivered.

The control apparatus of block 60 is responsive to various control inputs including a reference signal 72 and one or more feedback signals 74 to establish the frequency and voltage of the polyphase electric power supplied to the motor 16. More fundamentally, the control apparatus also determines the frequency at which the firing signals are supplied to the transmission control apparatus 70 over lines 62, 64 and 66. As indicated above, the manner by which the frequency and voltage of the output power are controlled and the manner by which the firing signals are generated will be better appreciated through study of the aforesaid patent applications.

Before turning attention to the firing signal transmission control apparatus 70 of this invention, the general mode of operation of the drive system of FIG. 1 will be described. It should be borne in mind that the basic function of the inverter circuits 12, 13 and 14 is to transform d-c power from the source 11 to a-c power for delivery through Phases A, B and C to the motor 16. To accomplish this in Phase A, the gate controlled rectifier 35 and the gate controlled rectifier 36 of circuit 12 conduct alternately for time periods established by the rate at which the cyclic firing pulses are supplied to the gate controlled rectifiers 35, 36, 38 and 40 over lines 62 and 62'. The manner in which conduction is initiated and stopped will now be described briefly with respect to Phase A and the inverter circuit 12.

Initially, let it be assumed that the main controlled rectifier 35 is conducting current to the motor 16 and that, as a result of previous operation, the capacitor 48 is charged such that a point 47 between the capacitor 48 and the inductor 46 is positive in potential with respect to the junction 50. To commutate the controlled rectifier 35 "off," the commutating controlled rectifier 38 is turned "on" by a firing signal pulse on conductor 62'b. A series oscillatory circuit comprising the commutating capacitor 48 and the commutating inductor 46 is now connected across the load current carrying controlled rectifier 35. A current pulse produced by the discharging series oscillatory circuit takes over the function of supplying load current to the motor 16 and causes the diode 42 to be forward biased. As a result, the current through the controlled rectifier 35 is reduced to zero. The feedback diode 42 conducts excess commutation current around the controlled rectifier 35 and provides a limited reverse bias across the controlled rectifier 35. This reverse bias lasts for a period greater than the turn-off time of the controlled rectifier 35 so that this controlled rectifier is caused to turn "off," i.e., to regain its blocking mode of operation.

After the commutating capacitor 48 has been charged to the opposite polarity, so that the junction 50 is more positive in potential than the positive bus 32, the commutating controlled rectifier 38 turns off. Since the controlled rectifier 35 is now turned off, reactive current circulates through the opposite feedback diode 44. The main controlled rectifier 36 can be fired at this time by applying a firing signal to its gate electrode through conductor 62'c. The commutating capacitor 48 thereafter has the appropriate polarity to commutate "off" this controlled rectifier when the commutating controlled rectifier 40 is turned on by a firing signal supplied over conductor 62'd. After the controlled rectifiers 36 and 40 are turned "off" to thus complete a full cycle of 360 electrical degrees, the capacitor 48 is charged to the same polarity as it was at the start of the commutation interval. For proper operation, the load and commutating rectifiers of inverter circuit 12 must be fired in the cyclic sequence of 35, 38, 36, 40, 35, 38, 36, 40, etc. This is, of course, equivalent to the cyclic sequence ABCDABCD... described in the introductory portion of this specification. It will be obvious that an orderly shut-down of the inverter 12 will not occur if the last firing pulse were delivered to either load rectifier 35 or load rectifier 36 since the conducting rectifier would not be commutated "off," the respective bus remaining connected to the motor 16. Similarly, an orderly start-up would not occur if the first firing pulse were supplied to one of the load rectifiers 35 and 36 and the capacitor 48 were for some reason not appropriately charged. The result would be a commutation failure and a subsequent shoot-through between the positive bus 32 and the negative bus 34 through load rectifiers 35 and 36. The firing signal transmission control apparatus 70 of this invention assures that orderly start-ups and shut-downs will occur.

It will, of course, readily occur to those skilled in the art that the conduction of the gate controlled rectifiers of inverter circuits 13 and 14 is controlled in the same manner by firing signal pulses supplied thereto from the firing signal generator 60 over the lines 64, 66, 64' and 66'. The alternating current thus supplied to Phases B and C by the inverter circuits 13 and 14, respectively, has the same frequency as the alternating current electric power supplied to Phases A, but the waveforms supplied to the three phases are displaced from one another in time by 120 electrical degrees as is customary in three-phase systems.

Figure 2:
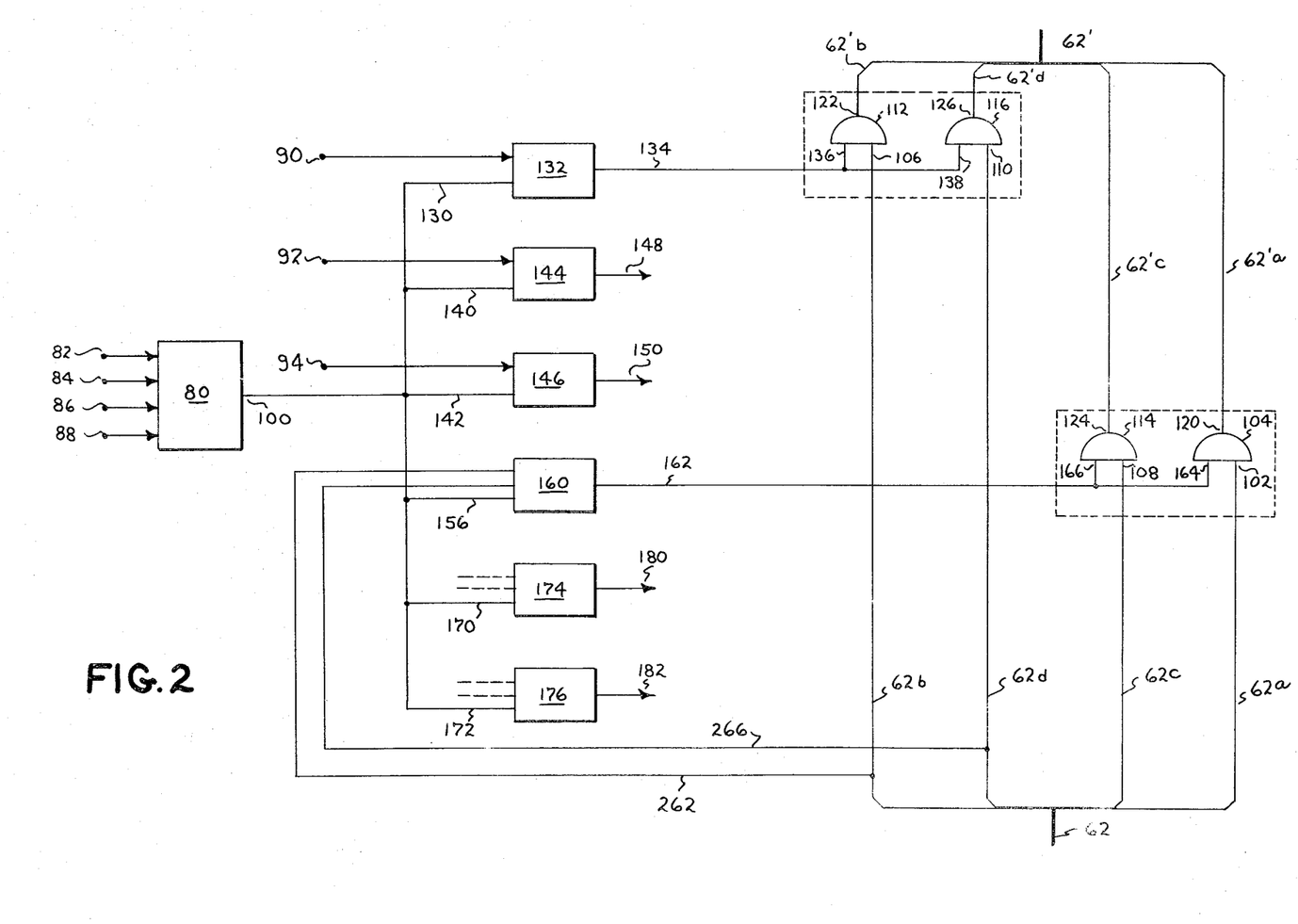
FIG. 2 is a partially schematic block diagram of the firing signal transmission control apparatus of this invention.

Referring now to FIGS. 1 and 2, the firing signal transmission control apparatus 70 will be described. As shown, the transmission control apparatus 70 includes a control signal generator 80 having a number of inputs 82, 84, 86 and 88 to which various input signals are supplied. While the details of construction and function of a preferred form of the control signal generator 80 will be described presently, it will suffice to note at this juncture that the basic function of the control signal generator 80 is to produce at its output 100 an "operate" signal when operation of the power conversion apparatus (the inverter circuits 12, 13 and 14) is desired and to produce at its output 100 a "non-operate" signal when operation is not desired. Operation is "desired" when it is desired that the source 11 and the load 16 be electrically interconnected through the power conversion apparatus and that firing signals be supplied to the rectifiers of the inverter circuits, and operation is "not desired" when electric power transmission between the source 11 and the load 16 is not desired.

Still referring to FIGS. 1 and 2, line 62 from the firing signal generator and control apparatus 60 is comprised of conductors 62a, 62b, 62c and 62d. Conductor 62a is connected to one input leg 102 of a dual input AND gate 104. Similarly, conductors 62b, 62c and 62d are connected, respectively, to inputs 106, 108 and 110 of dual input AND gates 112, 114 and 116. The outputs 120, 122, 124 and 126 of the AND gates 104, 112, 114 and 116, respectively, are connected to the conductors 62'a, 62'b, 62'c and 62'd leading, respectively, to the rectifiers 35, 38, 36 and 40 of inverter circuit 12. Since an AND gate is a logic element which will produce a HIGH output signal only when HIGH signals are present at all of its inputs, a HIGH firing signal supplied on any one of the conductors 62a, 62b, 62c and 62d will be transmitted to the appropriate controlled rectifier only if a HIGH signal is present at the other input of the AND gate through which the firing signal must pass. Therefore, transmission of firing signals between the firing signal generator 60 and the controlled rectifiers of inverter circuit 12 can be controlled through the application of enabling signals to the AND gates 104, 112, 114 and 116.

Although not illustrated by FIG. 2, similar AND gates are provided between the appropriate conductors of lines 64 and 64' and lines 66 and 66' for controlling the transmission of firing signals to the inverter circuits 13 and 14.

As illustrated by FIG. 2, the output 100 of the control signal generator 80 is connected by a conductor 130 to an enabling device 132 which is capable of producing HIGH or LOW output signals. The output signals from the enabling device 132 are supplied over conductor 134 to the second inputs 136 and 138 of AND gates 112 and 116, respectively. When a HIGH signal is produced by the enabling device 132, both AND gates 112 and 116 are enabled, and firing signals supplied on conductors 62b and 62d are delivered over conductors 62'b and 62'd to the commutating rectifiers 38 and 40 (FIG. 1). On the other hand, firing signals supplied on conductors 62b and 62d are blocked by the AND gates 112 and 116 when a LOW signal is produced by the enabling device 132. AND gates 112 and 116 thus constitute transmission means having a first operative condition, the enabled condition, in which the transmission of firing pulses to the commutating rectifiers is permitted and a second operative condition, the disabled condition, in which the transmission of firing signals is prevented. The output 100 is also connected by conductors 140 and 142 to similar enabling devices 144 and 146, respectively. The enabling devices 144 and 146 produce HIGH and LOW output signals and supply these signals over output conductors 148 and 150 to transmission means (not shown) for controlling the transmission of firing pulses to the commutating rectifiers of inverter circuits 13 and 14. The construction and function of enabling devices 144 and 146 and their associated transmission means are identical to enabling device 132 and the AND gates 112 and 116 and are therefore not illustrated in detail.

The output 100 of the control signal generator 80 is connected by a conductor 156 to an enabling device 160 which is capable of producing HIGH or LOW output signals. The output signals from the enabling device 160 are supplied over conductor 162 to the second inputs 164 and 166 of AND gates 104 and 114, respectively. When a HIGH signal is produced by the enabling device 160, both AND gates 104 and 114 are enabled, and firing signals supplied on conductors 62a and 62c are delivered over conductors 62'a and 62'c to the load rectifiers 35 and 36 (FIG. 1). On the other hand, firing signals supplied on conductors 62a and 62c are blocked by the AND gates 104 and 114 when a LOW signal is produced by the enabling device 160. AND gates 104 and 114 thus constitute transmission means having a first operative condition, the enabled condition, in which the transmission of firing pulses to the load rectifiers is permitted and a second operative condition, the disabled condition, in which the transmission of firing signals is prevented. The output 100 is also connected by conductors 170 and 172 to similar enabling devices 174 and 176, respectively. The enabling devices 174 and 176 produce HIGH and LOW output signals and supply these signals over output conductors 180 and 182 to transmission means (not shown) for controlling the transmission of firing pulses to the load rectifiers of inverter circuits 13 and 14. The construction and function of enabling devices 174 and 176 and their associated transmission means are identical to enabling device 160 and the AND gates 104 and 114 and are therefore not illustrated.

Figure 3:
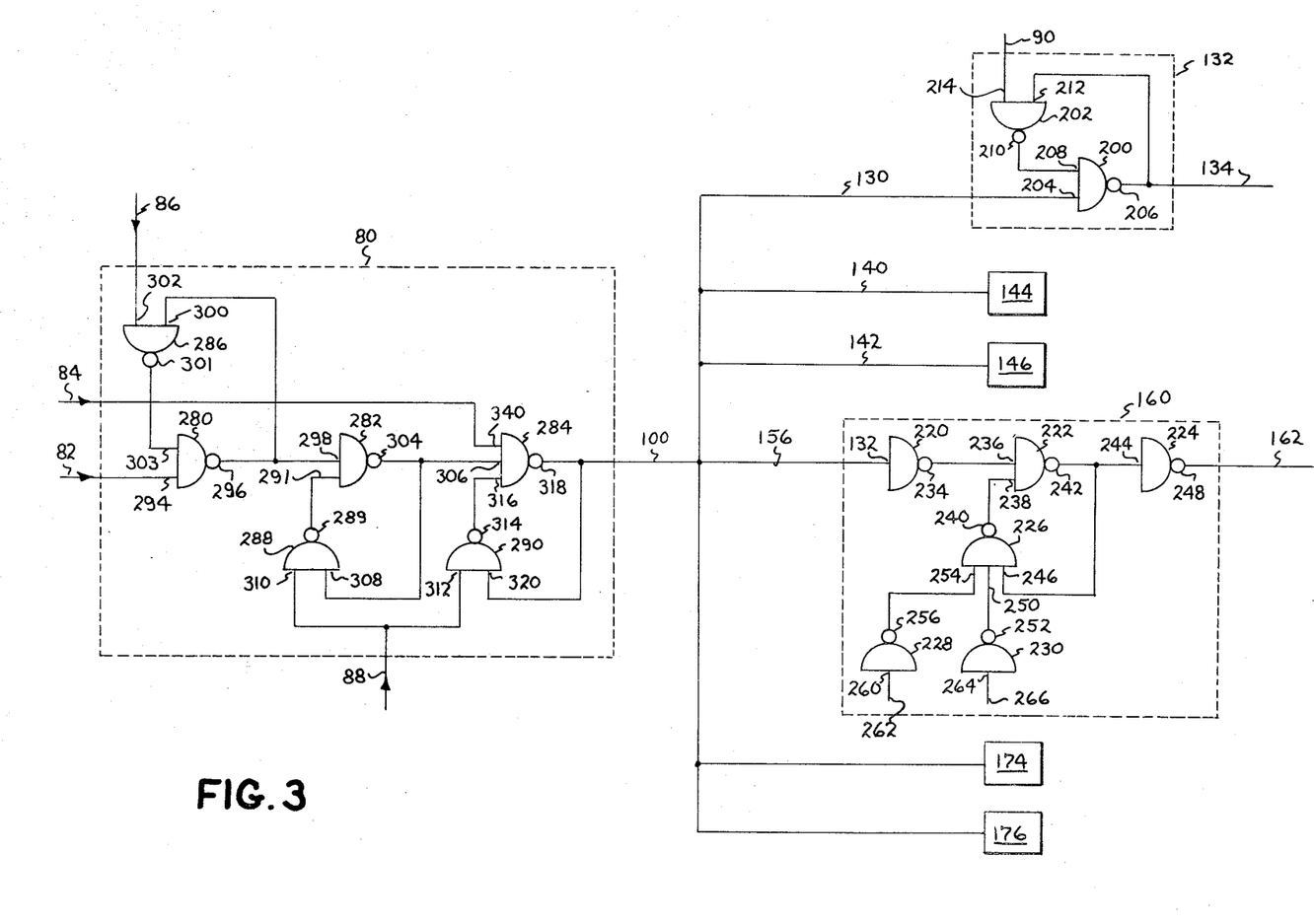
FIG. 3 is a schematic diagram of a preferred embodiment of the control signal generator and the first and second enabling means.

Referring now to FIGS. 2 and 3, preferred embodiments of the control signal generator 80, the enabling device 132, and the enabling device 160 will be described. As illustrated, each of these devices is comprised of a number of interconnected NAND-NOR logic elements. A NAND-NOR logic element is one which will produce a LOW output signal if and only if all of its input signals are HIGH. Any combination of HIGH and LOW input signals, or all LOW input signals, will produce a HIGH output signal. Deferring a detailed description of the control signal generator 80, it will be noted at this time that it is capable of producing either a HIGH signal or a LOW signal at its output 100, a HIGH signal being a "non-operate" signal and a LOW signal being an "operate" signal.

Enabling device 132 will now be described, this device being comprised of two NAND-NOR gates 200 and 202. The dual input gate 200 has an input leg 204 connected to the conductor 130, an output 206 connected to conductor 134, and a second input 208 connected to receive the signal produced at the output 210 of dual input gate 202. A first input 212 of the gate 202 is connected to the output 206 of gate 200, and the second input 214 of gate 202 is connected to receive signal 90. As illustrated by FIG. 1, a current transformer 220 is provided for detecting current flow through the circuit including the inductor 46 and the capacitor 48, such current flow occurring as a result of firing either of the commutating rectifiers 38 and 40. The current transformer 220 is coupled to suitable means 222 for producing a LOW signal when current is detected and a HIGH signal at all other times. The output of device 222 is coupled to the input 90 of the enabling device 132. Accordingly, a LOW signal is supplied to the gate input 214 when current is flowing in the capacitor 48, and a HIGH signal is supplied to input 214 at all other times.

With reference to FIGS. 2 and 3, enabling device 160 will now be described. This device includes six NAND-NOR gates 220, 222, 224, 226, 228 and 230. The gate 220 has a single input 232 connected to the conductor 156 and an output 234 connected to an input 236 of dual input gate 222. The other input 238 of gate 222 is connected to the output 240 of gate 226, and the output 242 of gate 222 is connected to the input 244 of single input gate 224 and to input 246 of triple input gate 226. The output 248 of gate 224 is connected to conductor 162. A second input 250 of gate 226 is connected to the output 252 of single input gate 230, and the third input 254 of gate 226 is connected to the output 256 of single input gate 228. The single input 260 of gate 228 is connected by conductor 262 to conductor 62b. Accordingly, a HIGH signal is supplied to input 260 only when a firing signal for delivery to commutating rectifier 38 is being generated by the firing signal generator 60 (FIG. 1); a LOW signal is supplied to input 260 at all other times. The single input 264 of gate 230 is connected by conductor 266 to conductor 62d. Accordingly, a HIGH signal is supplied to input 264 only when a firing signal for delivery to commutating rectifier 40 is being generated by the firing signal generator 60 (FIG. 1); a LOW signal is supplied to input 264 at all other times.

The manner by which the enabling devices 132, 144, 146, 160, 174 and 176 provide, in conjunction with the control signal generator 80 and the firing signal transmission means, orderly start-up and shut-down of the inverter circuits 12, 13 and 14 will now be described with reference to FIGS. 1–3. Let it initially be assumed that the power conversion equipment is not operating and that a HIGH non-operate signal is present at output 100 of the control signal generator 80, and that a temporary initializing LOW signal has been supplied to input 214 of gate 202 upon initial application of control power. Let it also be assumed that the control apparatus 60 is in operation and that firing signals are being produced in the proper sequence. Under such conditions, HIGH firing signals will periodically be supplied to inputs 260 and 264 of the gates 228 and 230, respectively. Because of the sequencing of the firing signals, HIGH signals will never be simultaneously supplied to inputs 260 and 264, but LOW signals may be simultaneously present. Under the conditions just described, the temporary initializing LOW signal at input 214 of gate 202 will cause a HIGH signal to be supplied to input 208 of gate 200. The HIGH signals at both inputs 204 and 208 of gate 200 will produce a LOW, or disabling, signal at output 206 which is also applied at the input 212 of gate 202 to holds its output 210 in the HIGH state. This assures that firing signals on conductors 62b and 62d will not be transmitted to the commutating rectifiers 38 and 40. Similarly, the HIGH non-operate signal at input 232 of gate 220 will produce a LOW signal at its output 234 and at input 236 of gate 222. The LOW input signal at input 236 will cause a HIGH signal at output 242 of gate 222 and at input 244 of gate 224. The HIGH signal at input 224 will result in a LOW, or disabling, signal at output 248. This assures that firing signals on conductors 62a and 62c will not be transmitted to load rectifiers 35 and 36.

If a LOW operate signal is now generated by the control signal generator 80, the signal at output 206 will immediately become HIGH, and gates 112 and 114 will therefore be enabled. This means that firing signals on conductors 62b and 62d can immediately be transmitted to the commutating rectifiers 38 and 40. The LOW operate signal causes a HIGH signal to be supplied to input 236 of gate 222. The pre-existing HIGH signal at output 242, however, will not change to LOW unless a HIGH signal is also supplied to input 238. Under these conditions, a HIGH signal can be produced by gate 226 only when the signal to one of its inputs 250 and 254 become LOW, and this will only occur when a firing signal is present on one of the conductors 62b or 62d. Thus, the first firing signal to one of the commutating rectifiers following the initiation of the LOW operate signal at output 100 of control signal generator 80 will cause the signal at output 242 of gate 222 to become LOW. The LOW output from gate 222 will then produce a HIGH signal at output 248 of gate 224. This means that firing signals on conductors 62a and 62c can then be transmitted to the load rectifiers 35 and 36. Thus, start-up of the inverter circuit 12 is always initiated by the firing of one of the commutating rectifiers 38 and 40, the firing of the first commutating rectifier causing the enabling device 160 to permit the firing of the next load rectifier in the normal firing sequence. By initially firing a commutating rectifier, the capacitor 48 will be properly charged for commutation of the first load rectifier. Charging of the capacitor 48 to the proper polarity will occur even if the capacitor is initially uncharged if the first load rectifier is fired while the initial commutating rectifier is still conducting.

During operation, the LOW operate signal at input 204 of gate 200 maintains the HIGH enable signal at output 206 no matter what changes occur in the signal supplied to input 208 of gate 200. Similarly, the LOW feedback signal from output 242 of gate 222 to gate 226 maintains a HIGH signal at input 238 of gate 222 no matter what changes occur in the signals supplied to gates 228 and 230. As long as the LOW operate signal is supplied to gate 220, a HIGH enable signal will be present at output 248 of gate 224.

If inverter shut-down is desired, the LOW enable signal at output 100 of control signal generator shifts to a HIGH non-operate signal. This immediately produces a LOW signal at input 236 of gate 222, a HIGH signal at input 244 of gate 224, and a LOW disable signal at output 248 of gate 224. As a result, the generation of a HIGH non-operate signal immediately disables the AND gates 104 and 114 and thus prevents the further transmission of firing signals to the load rectifiers 35 and 36. A HIGH non-operate signal at input 204 of gate 200 will not, however, cause the HIGH enabling signal at output 206 to shift to a LOW disabling signal unless a HIGH signal is also produced by gate 202. Since input 212 of gate 202 is connected to receive the pre-existing HIGH enabling signal, a HIGH signal will be produced at output 210 only when a LOW signal indicating flow of current through the commutating capacitor 48 is supplied to input 214. Thus, the generation of a HIGH non-operate signal at output 100 of control signal generator 80 is not immediately effective to block transmission of firing signals to the commutating rectifiers 38 and 40. Firing signals to the rectifiers 38 and 40 are not blocked until current flow through the capacitor 48 has been detected. This means that operation of the inverter circuit 12 ceases with the firing of one of the commutating rectifiers. Accordingly, shut-down is accomplished in an orderly manner with both load rectifiers 35 and 36 commutated "off."

Heretofor, it has been merely assumed that control signal generator 80 produces a LOW operate signal when inverter operation is desired and a HIGH non-operate signal when inverter operation is not desired. The construction and mode of operation of the preferred control signal generator 80 will now be described. The control signal generator 80 is comprised of six NAND-NOR gates 280, 282, 284, 286, 288 and 290. A start-stop device 292 (FIG. 1) produces at input 82 of control signal generator a LOW stop signal or a HIGH start signal. In typical operation, the start-stop device would be manually operated by an attendant. The signal generated by the device 292 is supplied to an input 294 of dual input gate 280. The output 296 of gate 280 is coupled both to an input 298 of dual input gate 282 and an input 300 of dual input gate 286. The other input 302 of gate 286 is connected through generator input 86 to the control apparatus 60 to receive therefrom a frequency signal that is normally HIGH but periodically becomes LOW. The output 301 of gate 286 is connected to input 303 of gate 280. The output 304 of gate 282 is connected both to an input 306 of triple input gate 284 and to an input 308 of dual input gate 288. The other input 310 of gate 288 is connected to the control apparatus 60 to receive therefrom a HIGH signal when the frequency at which the firing signal are being produced is above a certain minimum level and a LOW signal when the frequency is at the minimum level. The frequency signal 88 is also supplied to an input 312 of dual input gate 290, the output 314 of which is connected to input 316 of gate 284. The output 318 of gate 284 is connected to output 100 and to the input 320 of gate 290. The output 289 of gate 288 is connected to input 291 of gate 282. As described and claimed by copending patent application Ser. No. 172,122, entitled "Protection Means For Preventing Overvoltage And Undervoltage Conditions In Power Circuits," filed concurrently herewith on 1971 in the names of Carlton E. Graf and Einar A. Skogsholm and assigned to the assignee of this invention, means 330 (FIG. 1) is provided for monitoring the voltage across terminals 26 and 28 and for generating a HIGH signal on conductor 332 when the voltage is within an acceptable range and a LOW signal on conductor 332 when the voltage is either greater than or less than the acceptable range. The conductor 332 is connected to input 84 of control signal generator 80 and to input 340 of gate 284.

The operation of the control signal generator 80 will now be described. Let it initially be assumed that the voltage across terminals 26 and 28 is within the acceptable range so that a HIGH signal is being delivered to input 340 of gate 284, that the firing signal generator 60 is producing firing pulses at the minimum frequency so that a LOW signal is being delivered to inputs 310 and 312 of gates 288 and 290, that periodic LOW signals are being supplied to input 302 of gate 286, and that the start-stop device 292 is supplying a LOW stop signal to input 294 of gate 280. Under these conditions, a HIGH NON-operate signal will be present at output 100 of the control signal generator 80. If a HIGH start signal is now delivered to input 294, the signal at output 296 will switch from HIGH to LOW only if a HIGH signal is present at input 303. However, the signal at 303 will be HIGH only when a LOW signal is supplied to input 302 of gate 286. Thus is will be seen that a HIGH start signal will not be immediately effective if it happens to occur simultaneously with the normal HIGH signal at input 302. As soon as the signal at input 302 goes LOW, however, the signal at input 303 will go HIGH and the signal at output 296 will go LOW. The feedback from output 296 to gate 286 will then assure that the signal at output 296 will remain LOW so long as a HIGH start signal is supplied to input 294. The reason for this feedback latching circuit is to delay slightly under most circumstances the conversion of a HIGH start signal to a LOW signal at input 298, thus permitting time for any initial fluctuations in the HIGH start signal due to relay bounce and the like to dissipate prior to the generation of the LOW signal at output 296. Once a LOW signal is supplied to input 298, the signal at output 304 will switch from LOW to HIGH, and the signal at output 318 and output 100 will become a LOW operate signal since the signals at inputs 340 and 316 of gate 284 are already HIGH. The generation of the LOW operate signal will then result in the orderly start-up procedure described above.

Let it, however, be assumed that a HIGH start signal is supplied to input 294 at a time when the firing signal generator 60 is generating firing pulses at a frequency above the minimum frequency. In other words, let it be assumed that a HIGH start signal is supplied when a HIGH signal is being supplied to inputs 310 and 312. The HIGH non-operate signal pre-existing at input 320 and the HIGH signal at input 312 produce under such circumstances a LOW signal at output 314 of gate 290. This signal is supplied to input 316 of gate 284 where it serves to block the effectiveness of a HIGH start signal until such time as the frequency returns to the minimum level and the signal at inputs 310 and 312 becomes LOW. It will thus be seen that a feedback latching circuit is provided for preventing inverter start-up when the operating frequency is above a desired minimum level.

At this point, it will be obvious that a LOW signal at input 340 representative of an overvoltage or undervoltage condition will prevent a start-up by maintaining a HIGH non-operate signal at output 100.

Let it now be assumed that a LOW operate signal has been generated and that inverter operation has started. Under such conditions, the operating frequency will normally build up above the minimum level to that determined by the control apparatus 60. When the operating frequency exceeds the minimum level, the signal at inputs 310 and 312 will shift from LOW to HIGH. When this occurs, the signal at output 289 of gate 288 will shift from HIGH to LOW, but there will be no change in the HIGH signal produced by gate 282. Similarly, there will be no change in the output of gate 290 since the HIGH signal at output 314 is still maintained by the LOW operate signal supplied to input 320.

If, during operation, an overvoltage or undervoltage condition should occur, the resulting LOW signal to input 340 of gate 284 would immediately cause the signal at output 100 to shift from the LOW operate signal to a HIGH non-operate signal.

If the voltage stays within the acceptable range and the operating frequency is above the minimum level, the delivery of a LOW stop signal to input 294 of gate 280 will not be immediately effective to stop operation of the inverter circuit 12. This is, of course, desirable since it is normally desirable to maintain operation regeneratively until the minimum frequency level is reached. The application of a LOW stop signal at input 294 will immediately cause the signal at output 296 to become HIGH. Since, however, a LOW signal is being supplied to input 291 of gate 282, there will be no change in the HIGH signal at output 304. When the frequency drops to the minimum level, the signal at input 310 of gate 288 will become LOW and, accordingly, the signal at input 291 of gate 282 will become HIGH. Since at this instant HIGH signals will be present at both of inputs 291 and 298, the signal at input 306 of gate 284 will become LOW and, consequently, a HIGH non-operate signal will be generated at output 318 of gate 284 and supplied to control signal generator output 100. At this time, inverter operation will be stopped in the orderly manner described above.

It will, of course, be obvious to those skilled in the art that the control signal generator 80 and the enabling devices 132 and 160 can take on forms different than those illustrated and described herein. In particular, it will be appreciated that the illustrated logic networks and elements can be readily replaced by functionally equivalent networks and elements.

In summary, the present invention provides improved means for providing orderly start-up and shut-down of inverter circuits. More particularly, the invention assures that the commutating capacitor is properly charged prior to the initial firing of a load rectifier upon start-up and that the load rectifiers are all commutated "off" prior to shut-down. The invention also assures that start-up and shut-down will not occur when prescribed operating conditions are not satisfied.

While the invention has been particularly shown and described with reference to a preferred embodiment thereof, it will be understood by those skilled in the art that various changes in form, details, and application may be made therein without departing from the spirit and scope of the invention. For example, it has been pointed out above that logic networks and elements can take on forms differing from those illustrated. It may be desirable to monitor additional or different operating parameters and use such parameters as control inputs to the control signal generators. Furthermore, although the invention has been illustrated in a polyphase drive system, it is equally applicable to single phase systems. Accordingly, it is intended that all such modifications and changes be included within the scope of the appended claims.

What is claimed as new and is desired to secure by Letters Patent of the United States is:

1. In an inverter circuit including at least one set of two series connected load current carrying gate controlled rectifiers connected across a source of direct current electric power, a respective set of two series connected commutating gate controlled rectifiers of similar polarity connected across said source of electric power, a capacitor and an inductor connected in series circuit relationship between the junction of said two load rectifiers and the junction of said two commutating rectifiers, a set of two diode rectifiers each connected in parallel circuit relationship across a respective one of said load rectifiers in reverse polarity with respect to said load rectifier, and firing signal generation means for generating firing signals for delivery in a predetermined cyclic sequence to said rectifiers, firing signal transmission control means comprising:

first firing signal transmission means between said signal generation means and said commutating rectifiers, said first firing signal transmission means having a first operative condition in which transmission therethrough of firing signals is permitted and a second operative condition in which transmission therethrough of firing signals is prevented, second firing signal transmission means between said signal generation means and said load rectifiers, said second firing signal transmission means having a first operative condition in which transmission therethrough of firing signals is permitted and a second operative condition in which transmission therethrough of firing signals is prevented, control signal generation means for generating an operate signal when operation of the inverter circuit is desired and a non-operate signal when operation of the inverter circuit is not desired, first enabling means coupled to said control signal generation means and said first firing signal transmission means and being responsive to an operate signal to maintain said first firing signal transmission means in its said first operative condition throughout the entire duration of the operate signal, and second enabling means coupled to said control signal generation means, said second firing signal transmission means, and said firing signal generation means and being responsive to an operate signal and the first firing signal to one of said commutating rectifiers following the initiation of the operate signal to maintain said second firing signal transmission means in its said first operation condition throughout the remaining duration of the operate signal, whereby operation of the inverter circuit is initiated by the firing of one of the commutating rectifiers.

2. Firing signal transmission control means as defined by claim 1 in which said second enabling means is responsive to a non-operate signal to maintain said second firing signal transmission means in its said second operative condition throughout the entire duration of the non-operate signal.

3. Firing signal transmission control means as defined by claim 2 in which said first enabling means further comprises means for detecting the firing of said commutating rectifiers, said first enabling means being responsive to a non-operate signal and the firing of one of said commutating rectifiers following the initiation of the non-operate signal to maintain said first firing signal transmission means in its said second operative condition throughout the remaining duration of the non-operate signal, whereby operation of the inverter circuit ceases with the firing of a commutating rectifier.

4. Firing signal transmission control means as defined by claim 3 in which said first enabling means is responsive to a non-operate signal and the first firing of a commutating rectifier following the initiation of the non-operate signal.

5. Firing signal transmission control means as defined by claim 3 in which said first enabling means and said second enabling means comprise logic networks.

6. Firing signal transmission control means as defined by claim 1 in which said control signal generation means includes an output coupled to said first and second enabling means, a primary input, and at least one second secondary input, said control signal generation means adapted to initially generate a selected one of the operate and non-operate signals at said output only in response to the combination of a predetermined signal at said primary input and a predetermined signal at said secondary input and thereafter maintain the selected signal at said output so long as the predetermined signal is maintained at said primary input.

7. Firing signal transmission control means as defined by claim 6 in which said control signal generation means comprises a logic network having said primary and secondary inputs and said output.

8. Firing signal transmission control means as defined by claim 7 in which said lock network includes feedback latching means coupled to said secondary input.

9. Firing signal transmission control means as defined by claim 1 in which said control signal generation means includes an output coupled to said first and second enabling means, at least one primary input, at least one secondary input, and logic means interconnecting said inputs and said output, said logic means adapted to initially generate an operate signal at said output only in response to a combination of start signals at all of said primary inputs and a signal representative of a predetermined operating condition at at least one of said secondary inputs and thereafter maintain the operate signal at said output so long as start signals are maintained at all of said primary inputs.

10. Firing signal transmission control means as defined by claim 9 in which said logic means includes at least first and second primary inputs, said logic means adapted to immediately generate a non-operate signal at said output in response to a stop signal at said first primary input irrespective of the signals at said second primary input and said secondary input.

11. Firing signal transmission control means as defined by claim 10 in which said logic means is adapted to generate a non-operate signal at said output in response to a combination of a start signal at said first primary input and a stop signal at said second primary input only when a signal representative of a predetermined operating condition is supplied to at least one of said secondary inputs, said logic means thereafter maintaining the non-operate signal so long as the stop signal is maintained at said second primary input.

12. Firing signal transmission control means as defined by claim 11 in which said second enabling means is responsive to a non-operate signal to maintain said second firing signal transmission means in its second operate condition throughout the entire duration of the non-operate signal.

13. Firing signal transmission control means as defined by claim 12 in which said first enabling means further comprises means for detecting the firing of said commutating rectifiers, said first enabling means being responsive to a non-operate signal and the firing of one of said commutating rectifiers following the initiation of the non-operate signal to maintain said first firing signal transmission means in its said second operative condition throughout the remaining duration of the non-operate signal, whereby operation of the inverter circuit ceases with the firing of commutation rectifier.

14. Firing signal transmission control means as defined by claim 13 in which said first enabling means is responsive to a non-operate signal and the first firing a commutating rectifier following the initiation of the non-operate signal.

15. Firing signal transmission control means as defined by claim 13 in which said first enabling means and said second enabling means comprise logic networks.

16. An a-c adjustable speed drive system comprising:
a polyphase a-c motor;
static power conversion means for changing direct current electric power to variable frequency polyphase electric power, said conversion means comprising a plurality of inverter circuits each adapted to couple a source of d-c electric power and a respective phase of said motor, each of said inverter circuits comprising at least one set of two series connected load current carrying gate controlled rectifiers for connection across the d-c source, a respective set of two series connected commutating gate controlled rectifiers of similar polarity for connection across the d-c source, a capacitor and an inductor connected in series circuit relationship between the junction of said two load rectifiers and the junction of said two commutating rectifiers, and a set of two diode rectifiers each connected in parallel circuit relationship across a respective one of said load rectifiers in reverse polarity with respect to said load rectifier;

firing signal generation means for generating firing signals for delivery to the rectifiers of all of said inverter circuits, the firing signals for delivery to the rectifiers of any selected inverter circuit being generated in a predetermined cyclic sequence and at the same frequency as the firing signals for delivery to the other inverter circuits;

control signal generation means for generating an operate signal when operation of said motor is desired and a non-operate signal when operation of said motor is not desired;

a plurality of first firing signal transmission means each between said firing signal generation means and the commutating rectifiers of a respective one of said inverter circuits, each of said first firing signal transmission means having a first operative condition in which transmission therethrough of firing signals is permitted and a second operative condition in which transmission therethrough of firing signals is prevented;

a plurality of second firing signal transmission means each between said firing signal generation means and the load rectifiers of a respective one of said inverter circuits, each of said second firing signal transmission means having a first operative condition in which transmission therethrough of firing signals is permitted and a second operative condition in which transmission therethrough of firing signals is prevented;

a plurality of first enabling means each coupled to said control signal generation means and a respective one of said first firing signal transmission means and being responsive to an operate signal to maintain said respective first firing signal transmission means in its said first operative condition throughout the duration of the operate signal;

a plurality of second enabling means each coupled to said control signal generation means, a respective one of said second firing signal transmission means, and said firing signal generation means and being responsive to an operate signal and the first firing signal to one of the commutating rectifiers of the respective inverter circuit following the initiation of the operate signal to maintain said respective second firing signal transmission means in its said first operative condition throughout the remaining duration of the operate signal;

whereby operation of the drive system is initiated in each of said inverter circuits by the firing of one of the commutating rectifiers.

17. A drive system as defined by claim 16 in which each of said second enabling means is responsive to a non-operate signal to maintain said respective second firing signal transmission means in its said second operative condition throughout the entire duration of the non-operate signal, and in which each of said first enabling means further comprises means for detecting the firing of said commutating rectifiers of the respective inverter circuit and in which each of said first enabling means is responsive to a non-operate signal and the firing of one of said commutating rectifiers of the respective inverter circuit following the initiation of the non-operate signal to maintain said respective first firing signal transmission means in its said second operative condition throughout the remaining duration of the non-operate signal, whereby operation of the drive system ceases in each of said inverter circuits by the firing of a commutating rectifier.

18. A drive system as defined by claim 16 in which said control signal generation means includes an output coupled to all of said first and second enabling means, a primary input, and at least one secondary input, said control signal generation means adapted to initially generate a selected one of the operate and non-operate signals at said output only in response to the combination of a predetermined signal at said primary input and a predetermined signal at said secondary input and thereafter maintain the selected signal at said output so long as the predetermined signal is maintained at said primary input.

* * * * *

PO-1050
(5/69)

United States Patent Office
CERTIFICATE OF CORRECTION

Patent No. 3,684,936      Dated August 15, 1972

Inventor(s) C. E. Graf

It is certified that error appears in the above-identified patent and that said Letters Patent are hereby corrected as shown below:

Column 16, line 2 "lock" should be corrected to -- logic -- so that this line reads as follows:

"defined by claim 7 in which said logic network includes"

Signed and sealed this 9th day of January 1973.

(SEAL)
Attest:

EDWARD M. FLETCHER, JR.
Attesting Officer

ROBERT GOTTSCHALK
Commissioner of Patents